United States Patent
Yamoto et al.

[11] Patent Number: 5,107,914
[45] Date of Patent: Apr. 28, 1992

[54] DRIVING MECHANISM FOR A MULTI-PIECE RIM

[75] Inventors: Hisayoshi Yamoto, Yamato; Masakazu Ohi, Ayase, both of Japan

[73] Assignee: Topy Kogyo Kabushiki Kaisha, Tokyo, Japan

[21] Appl. No.: 244,862

[22] Filed: Sep. 15, 1988

[30] Foreign Application Priority Data

Sep. 17, 1987 [JP] Japan .................. 62-141999[U]

[51] Int. Cl.⁵ .......................................... B60B 25/04
[52] U.S. Cl. .................................. 152/409; 301/95; 301/35 SL
[58] Field of Search ........................ 301/95-98, 301/35 SL; 152/396, 401, 407, 408, 409, 410, 411, 406

[56] References Cited

U.S. PATENT DOCUMENTS

| | | | |
|---|---|---|---|
| 1,276,597 | 8/1918 | Wagenhorst | 152/407 |
| 1,689,273 | 10/1928 | Zipper et al. | 152/410 |
| 3,003,538 | 10/1961 | Gerbeth | 152/410 X |
| 3,106,237 | 10/1963 | Holmes, Jr. | 152/410 |
| 3,599,697 | 8/1971 | Gerbeth | 152/410 |
| 3,882,919 | 5/1975 | Sons, Jr. et al. | 152/410 |
| 4,116,489 | 9/1978 | Walther | 152/410 X |

FOREIGN PATENT DOCUMENTS 576678 4/1933 Fed. Rep. of Germany ...... 152/410

Primary Examiner—Russell D. Stormer
Attorney, Agent, or Firm—Cushman, Darby & Cushman

[57] ABSTRACT

A driving mechanism having a driver-loose key provided between a rim base and a bead seat band mounted about the rim base of a multi-piece rim which has the rim base, the bead seat band, a pair of side rings and a lock ring. The driver-loose key is cross-shaped with the two portions thereof which are adapted to be inserted into a groove extending in the circumferential direction of the rim base between the rim base and the bead seat band being arc-shaped so as to have substantially the same curvature as that of the groove. With this structure the slippage of the bead seat band on the rim base can be minimized and the durability of the mechanism can be increased.

6 Claims, 5 Drawing Sheets

DRIVING MECHANISM FOR A MULTI-PIECE RIM

BACKGROUND OF THE INVENTION

1. Field of the Invention

The present invention relates to a driving mechanism for a large multi-piece rim for a wheel of an industrial vehicle and, in particular, to a driving mechanism using a driver loose-key between the rim base and the bead seat band of a multi-piece rim wherein the bead seat band, a pair of side rings and a lock ring are provided about the periphery of the rim base.

2. Description of the Prior Art

Multi-piece rims, which include a rim base, a bead seat band attached about the periphery of the rim base via an O ring and holding a bead portion of a tire from a radially inner side thereof, a pair of side rings each holding a bead portion of the tire from an axially outer side thereof, and a lock ring provided between the rim base and the bead seat band for locking the bead seat band on the rim base, are well known. In a large multi-piece rim used for a wheel of an industrial vehicle such as a construction vehicle, a driving mechanism having a driver-loose key is provided between the rim base and the bead seat band in order to minimize circumferential slippage of the bead seat band on the rim base.

A conventional driving mechanism is constructed, for example, as shown in FIGS. 5 and 6. Multi-piece rim 1 has rim base 2, bead seat band 4 attached about the periphery of the rim base via lock ring 6, side ring 5 provided about the periphery of the bead seat band and an O ring 3 provided between the rim base and the bead seat band. Driving mechanism 7 is constructed of driver pocket 8 fixed on rim base 2, driver pocket 9 fixed on bead seat band 4 and driver-loose key 10 which is cross-shaped. Portions 10a, 10b, 10c and 10d of driver-loose key 10 are inserted into a hole 11 defined in driver pocket 8, a groove 12 defined between driver pockets 9a and 9b, a groove 13a defined between driver pocket 8 and driver pocket 9a and a groove 13b defined between driver pocket 8 and driver pocket 9b, respectively. Portion 10a of driver-loose key 10 engages driver pocket 8 and portion 10b engages driver pocket 9a and/or driver pocket 9b, thereby preventing bead seat band 4 from circumferentially slipping on rim base 2. Driver-loose key 10 is placed at a desirable position in a radial direction of the rim and the driver-loose key is prevented from inclining, by inserting portions 10c and 10d into grooves 13a and 13b respectively. The grooves 13a and 13b are usually arc-shaped in a circumferential direction of the multi-piece rim as shown in FIG. 5, while the portions 10c and 10d of driver-loose key 10 are straight and extend perpendicularly to portions 10a and 10b as shown in FIG. 5 or as also shown in FIG. 1 of U.S. Pat. No. 3,599,697.

In such a conventional driving mechanism, however, since grooves 13a and 13b are arc-shaped having a certain curvature while portions 10c and 10d of driver-loose key 10 are straight, a clearance $C_1$ (FIG. 5) between portion 10c and an inner surface of groove 13a or between portion 10d and an inner surface of groove 13b must be fairly large, for example, more than 2.5 mm, in order to enable the portion 10c or 10d be inserted into groove 13a or 13b. This large clearance may cause driver-loose key 10 to have a large play. Further the looseness between driver-loose key 10 and driver pocket 8 or 9 tends to increase during use of the multi-piece rim 1 if the clearance $C_1$ is large. If the looseness increases, inclination of driver-loose key 10 will occur as shown in FIG. 7. In such a state, a fairly great slippage $S_1$ of bead seat band 4 on rim base 2 is allowed, thereby decreasing the ability of the driving mechanism to control slippage. If the amount of slippage $S_1$ becomes too great, O ring 3 is distorted or abraded and air can then leak from inside the tire.

Moreover, since the contact area between the arcuate inner surfaces of grooves 13a and 13b and the straight portions 10c and 10d of driver-loose key 10 is a point contact or at best a line contact, large local loads are applied to the tip portions of portions 10c and 10d or the inner surfaces of grooves 13a and 13b when a load in the circumferential direction is transmitted via driver-loose key 10. The large local loads will cause abrasion or deformation of these portions, thereby decreasing the durability of the driving mechanism.

SUMMARY OF THE INVENTION

An object of the present invention is to provide a driving mechanism for a multi-piece rim which can increase the contact area between a driver-loose key and a driver pocket and decrease the clearance therebetween, thereby maintaining a desirable posture and position of the driver-loose key and increasing the durability of the driving mechanism.

The foregoing object is realized by providing a driving mechanism in a multi-piece rim having a rim base, a bead seat band attached about the periphery of the rim base via a lock ring and holding a bead portion of a tire from a radially inner side thereof, and a pair of side rings each holding a bead portion of the tire from an axially outer side thereof, the driving mechanism being provided between the rim base and the bead seat band, the driving mechanism including:

a first driver pocket fixed on the rim base;

a second driver pocket fixed on the bead seat band so as to face the first driver pocket, the first and second driver pockets defining therebetween an arc-shaped groove with a curvature which extends in a circumferential direction of the rim base and substantially along the periphery of the rim base; and a cross-shaped driver-loose key having a longitudinal axis, a first portion of the driver-loose key which extends along the longitudinal axis of the driver-loose key engaging the first driver pocket, a second portion of the driver-loose key which extends along the longitudinal axis and in a direction opposite to the first portion engaging the second driver pocket, a third portion and a fourth portion of the driver-loose key, which extend in opposite directions substantially perpendicular to the longitudinal axis of the driver-loose key, said third and fourth portions each being arc-shaped with a curvature substantially identical to the curvature of the groove and being inserted into the groove.

The driving mechanism having the first and second driver pockets and the driver-loose key may be provided on the multi-piece rim at one position or may be arranged in plural in a circumferential direction of the multi-piece rim.

Since the third and fourth portions of the driver-loose key are arc shaped with a curvature substantially identical to the curvature of the groove defined between the first and second driver pockets, the clearance between the third and fourth portions and the inner surfaces of the groove can easily be small. The driver-loose key can be prevented from inclining substantially and can be maintained in a desirable posture by the small clearance. Accordingly, the looseness between the driver-loose key and the driver pockets can be minimized and the slip of the bead seat band on the rim base in the circumferential direction due to the inclination of the driver-loose key can be minimized and thus kept to an acceptable amount. As a result, the distortion and abrasion of the O ring between the rim base and the bead seat band can be prevented, and the first and second portions of the driver-loose key can always engage the first and second driver pockets, respectively, in a desired manner.

Moreover, since the contact area between the third and fourth portions and the inner surfaces of the groove can be maintained substantially as a surface contact, the contact area therebetween will be greatly increased in comparison with that in the conventional mechanism. Therefore, the load applied between these portions and the surfaces is uniformly dispersed, no large local load occurs, and the durability of the driving mechanism will increase.

BRIEF DESCRIPTION OF THE DRAWINGS

The above and other objects, features and advantages of the present invention will be become apparent and can be more readily appreciated from the following detailed description of the preferred exemplary embodiment of the invention, taken in conjunction with the accompanying drawings which are given by way of example only, and thus are not intended to limit the present invention, wherein like reference numbers designate corresponding parts in the various figures and in which.

DETAILED DESCRIPTION OF THE PREFERRED EMBODIMENT

Figure 1:
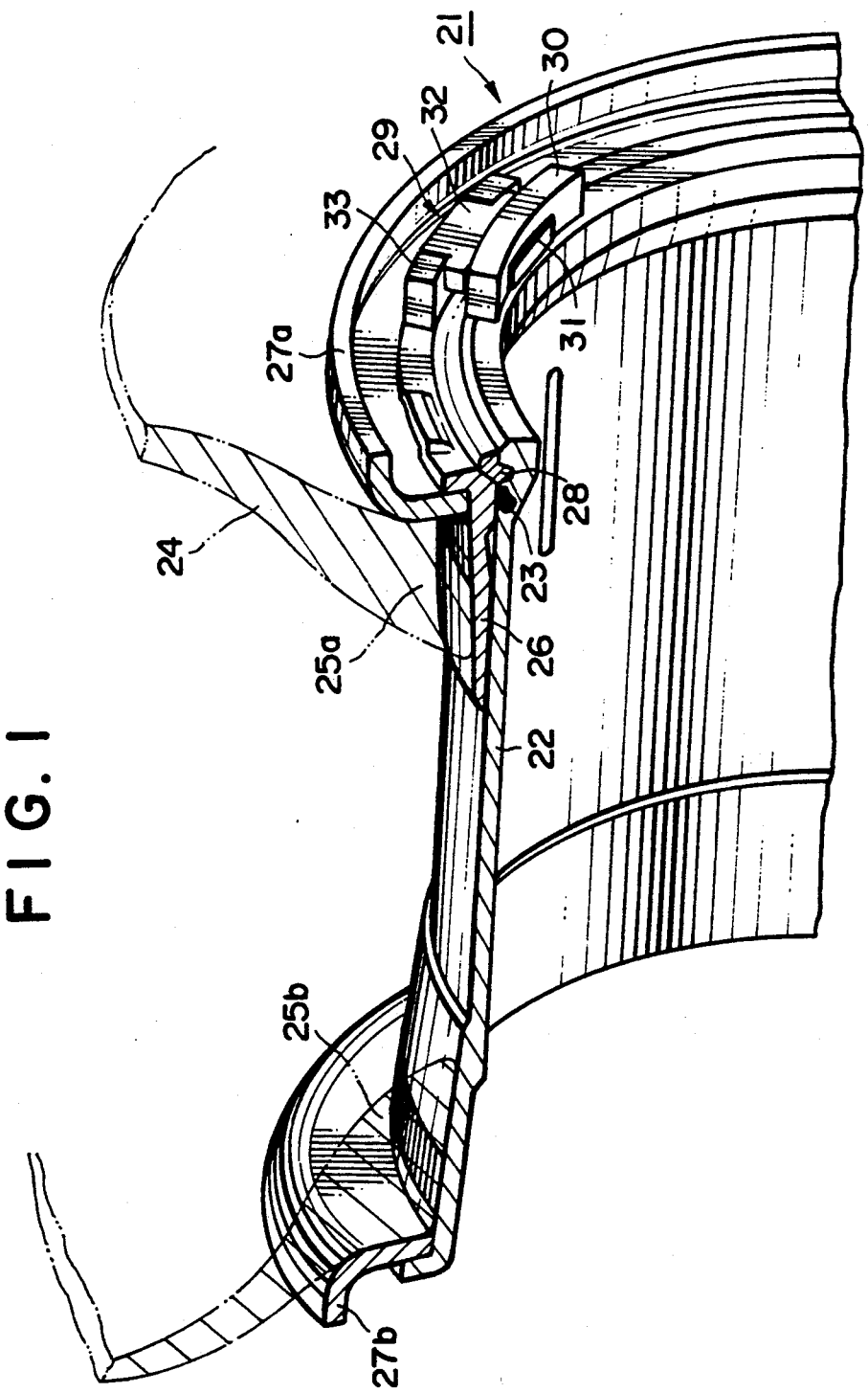
FIG. 1 is a partial perspective view of a driving mechanism in a multi-piece rim according to an embodiment of the present invention.

The preferred embodiment of the present invention will be described hereafter with reference to the attached drawings.

FIGS. 1-4 illustrate a driving mechanism provided in a multi-piece rim according to an embodiment of the present invention. Multi-piece rim 21 includes a rim base 22, a bead seat band 26 attached about the periphery of the rim base via O ring 23 and holding one of the bead portions 25a and 25b of tire 24 from a radially inner side thereof, a pair of side rings 27a and 27b each holding a bead portion of the tire from an axially outer side thereof, and a lock ring 28 provided between the rim base and the bead seat band for locking the bead seat band on the rim base.

Driving mechanism 29 provided between rim base 22 and bead seat band 26 of multi-piece rim 21 includes a first driver pocket 30 fixed on the side surface of rim base 22 by welding. A hole 31 is defined in first driver pocket 30 so as to extend through driver pocket 30 in the radial direction of rim base 22. Further, a second driver pocket 33 is fixed on the side surface of bead seat band 26 by welding so as to face first driver pocket 30. Second driver pocket 33 is defined by a pair of members 33a and 33b which are spaced from each other in the circumferential direction of bead seat band 26 and project in the axial direction of bead seat band 26 from the axially outer surface thereof. A groove 34 is defined between members 33a and 33b and extends straight in the radial direction of bead seat band 26.

A cross-shaped driver-loose key 32 is provided between first driver pocket 30 and second driver pocket 33. A first portion 32a of driver-loose key 32, which extends in one direction along the longitudinal axis of driver-loose key 32 is inserted into hole 31 from the radially outer side of rim base 22 and the first portion engages first driver pocket 30 in the circumferential direction of the rim base. A second portion 32b of driver-loose key 32, which extends along the longitudinal axis in a direction opposite to the direction in which first portion 32a extends, is inserted into groove 34 from the axially outer side of bead seat band 26 and the second portion engages second driver pocket 33 in the circumferential direction of the bead seat band.

Figure 2:
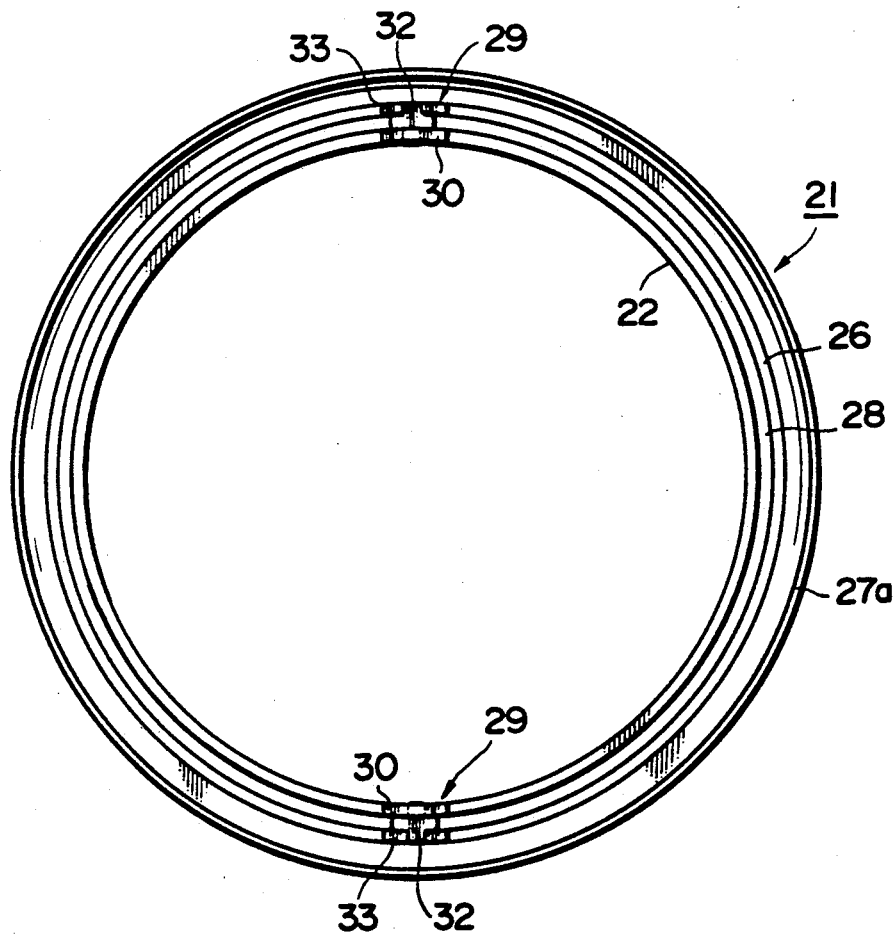
FIG. 2 is a side view of the entire multi-piece rim shown in FIG. 1.

In this embodiment, two driving mechanisms 29 each having first driver pocket 30, second driver pocket 33 and driver-loose key 32 are disposed along multi-piece rim 21 at opposite radial positions spaced from each other by 180°, as shown in FIG. 2.

Figure 3:
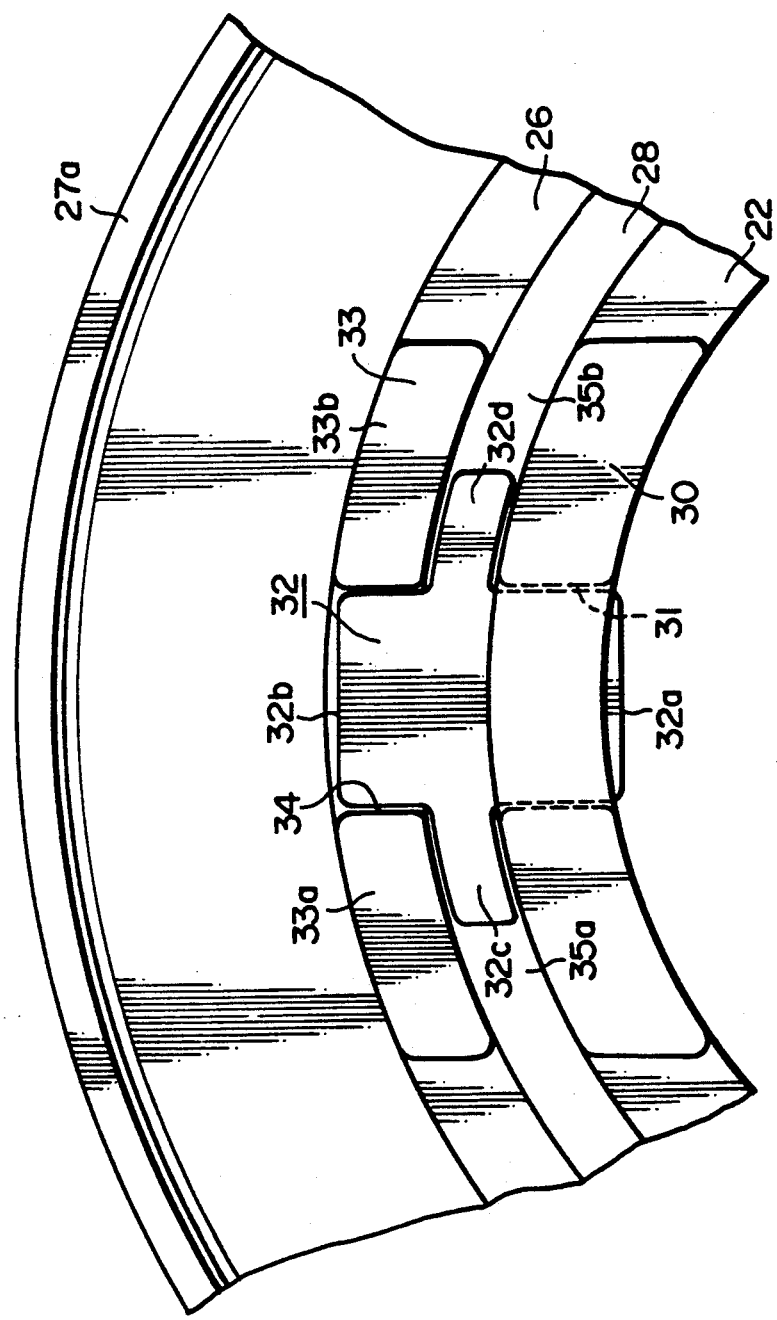
FIG. 3 is an enlarged front view of the driving mechanism shown in FIG. 1.
Figure 4:
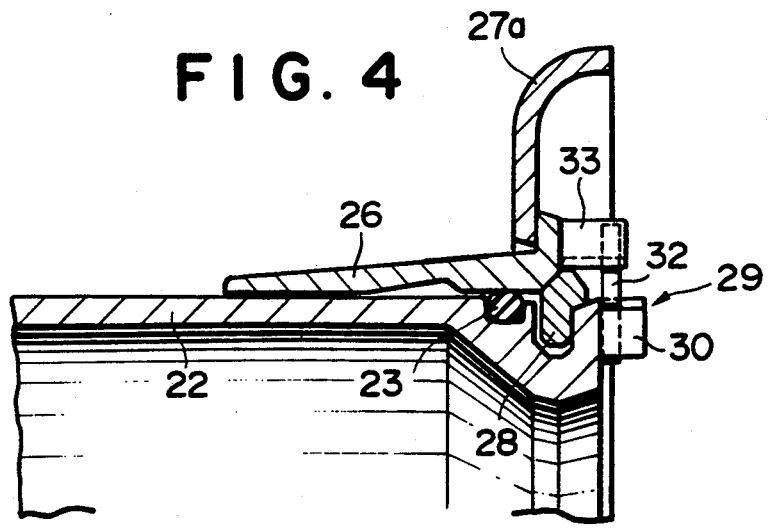
FIG. 4 is a partial vertical sectional view of the multi-piece rim shown in FIG. 1.

In FIGS. 1 and 3, the surface of first driver pocket 30 and the surface of member 33a of second driver pocket 33 in facing relation to each other extend in parallel with each other and in an arc in the circumferential direction of the rim. Similarly, the surface of first driver pocket 30 and the surface of member 33b of second driver pocket 33 in facing relation to each other extend in parallel with each other and in an arc in the circumferential direction of the rim. Thus, grooves 35a and 35b extending with a constant curvature in the circumferential direction of rim base 22 substantially along the periphery of the rim base are defined between these facing surfaces.

A third portion 32c and a fourth portion 32d of driver-loose key 32, which extend in opposite directions substantially perpendicular to the longitudinal axis of the driver-loose key 32, are inserted into grooves 35a and 35b, respectively. The third and fourth portions 32c and 32d are arc-shaped with a curvature substantially identical to the curvature of the grooves 35a and 35b. In this embodiment, the difference between the width of third portion 32c and the width of groove 35a and the difference between the width of fourth portion 32d and the width of groove 35b are less than or equal to 1.2 mm.

A typical material for driver-loose key 32 and driver pockets 30 and 33 is a mild steel, more preferably, a high tensile steel. As high tensile steel has a high yield point, when this material is used, deformation of the above members when a load is applied to the members can be minimized.

In the above-described embodiment, since the curvature of third and forth portions 32c and 32d is substantially the same as that of grooves 35a and 35b, the difference between the widths of the third and fourth portions and the widths of grooves 35a and 35b can easily be kept small, for example, 1.2 mm as noted above. Thus, although a difference of about 2.5 mm is required in the conventional mechanism, a difference of not greater than 1.2 mm can be easily provided in the mechanism according to the present invention. As a result, the clearances between portions 32a and 32d and the inner surfaces of grooves 35a and 35b can be less than half of those in the conventional mechanism. Therefore, the degree of the inclination of driver-loose key 32 also can be kept small.

The transmission of a load between first driver pocket 30 and second driver pocket 33, i.e., between rim base 22 and bead seat band 26, can be carried out smoothly, because of the small inclination of driver-loose key 32. Therefore, the slip of bead seat band 26 on rim base in the circumferential direction can be minimized and thus kept to an acceptable amount. As a result, the distortion or abrasion of O ring 23 can be prevented.

In addition, because the clearances between third and fourth portions 32c and 32d and driver pockets 30 and 33 are very small, excessive looseness or abrasion therebetween can be also prevented.

Figure 5:
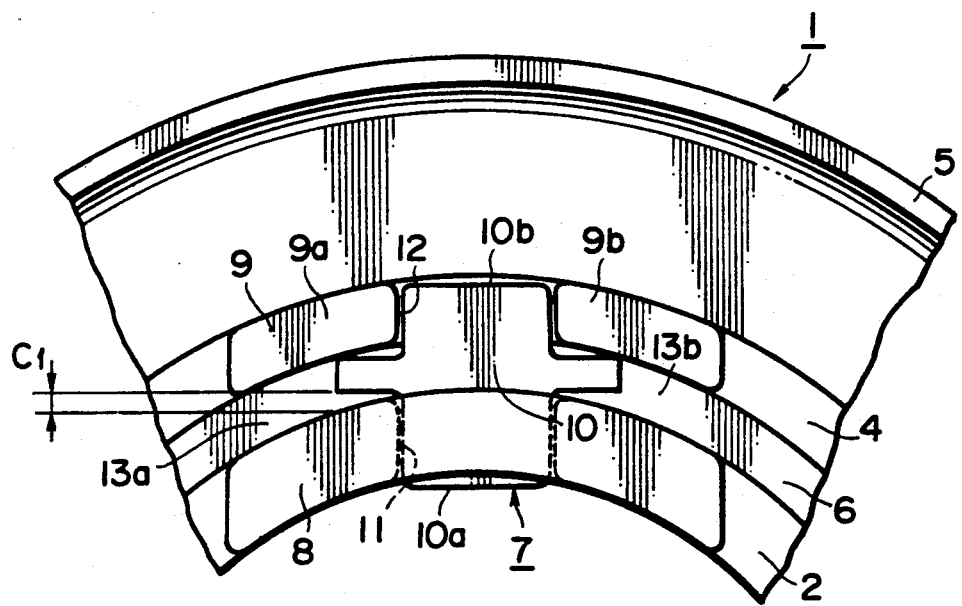
FIG. 5 is a front view of the conventional driving mechanism in a multi-piece rim.
Figure 6:
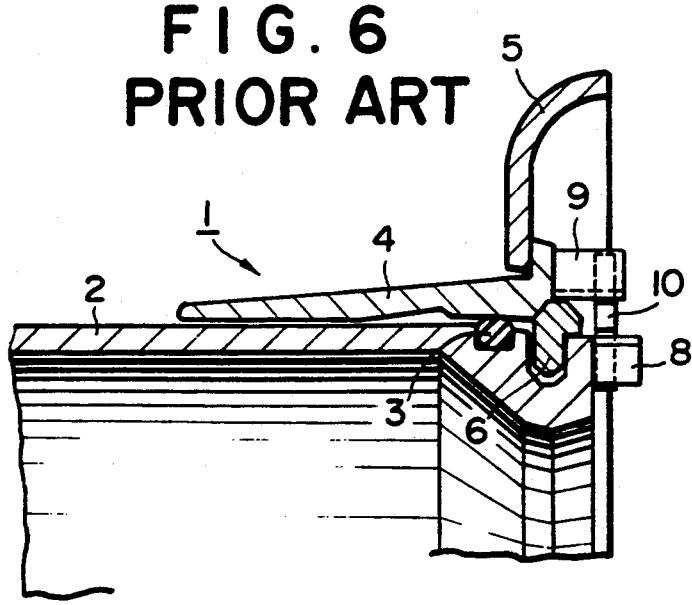
FIG. 6 is a vertical sectional view of the multi-piece rim shown in FIG. 5.
Figure 7:
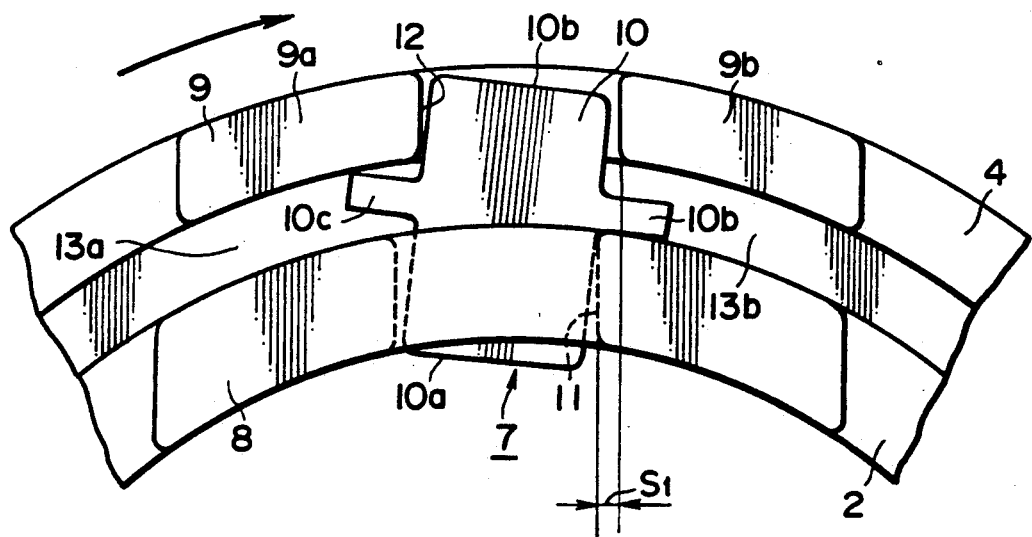
FIG. 7 is a front view of the driving mechanism shown in FIG. 5, showing a state of use.

As the result of endurance tests, using the multi-piece rim of this embodiment and the conventional multi-piece rim shown in FIGS. 5-7 and carried out under the same conditions, the slippage $S_1$ (FIG. 7) of the conventional rim increased to 7-9 mm while the slippage of the rim having the driving mechanism according to the present invention can be maintained within 2.5-3.5 mm, i.e., sufficiently within an acceptable amount.

Furthermore, since the inner surfaces of grooves 35a and 35b and the surfaces of third and fourth portions 32c and 32d of driver-loose key 32 have substantially the same curvature, the contact area between these surfaces can be maintained substantially as a surface contact. Accordingly, the load transmitted between rim base 22 and bead seat band 26 via driver-loose key 32 is uniformly applied over the contact surfaces between third and fourth portions 32c and 32d and driver pockets 30 and 33, and no large local load is applied to these portions or members. As a result, the deformation of the portions or members and the abrasion of the contact surfaces can be prevented, thereby increasing the durability of the driving mechanism.

Although only one preferred embodiment of the present invention has been described in detail, it will be appreciated by those skilled in the art that various modifications and alterations can be made to the particular embodiment shown without materially departing from the novel teachings and advantages of this invention. Accordingly, it is to be understood that all such modifications and alterations are included within the scope of the invention as defined by the following claims.

What is claimed is:

1. A driving mechanism in a multi-piece rim having a rim base, a bead seat band attached about the periphery of said rim base via a lock ring and holding a bead portion of a tire from a radially inner side thereof, and a pair of side rings each holding a said bead portion of said tire from an axially outer side thereof, said driving mechanism being provided between said rim base and said bead seat band, said driving mechanism comprising:
   a first driver pocket fixed on said rim base;
   a second driver pocket fixed on said bead seat band so as to face said first driver pocket, said first and second driver pockets defining therebetween an arc-shaped groove with a curvature which extends in a circumferential direction of said rim base and substantially along said periphery of said rim base; and
   a cross-shaped driver-loose key having a longitudinal axis, a first portion of said driver-loose key which extends along the longitudinal axis of the driver-loose key engaging said first driver pocket, a second portion of said driver-loose key which extends along the longitudinal axis and in a direction opposite to said first portion engaging said second driver pocket, a third portion and a fourth portion of said driver-loose key, which extend in opposite directions substantially perpendicular to said longitudinal axis of the driver-loose key, said third and fourth portions each being arc-shaped with a curvature substantially identical to said curvature of said groove and being inserted into said groove.

2. The mechanism of claim 1, wherein a plurality of sets of said first and second driver pockets and said driver-loose key are disposed about the circumference of said multi-piece rim.

3. The mechanism of claim 1, wherein said first driver pocket includes a member projecting in an axial direction of said rim base from an axially outer surface thereof, a hole is defined in said first driver pocket so as to extend in a radial direction of said rim base, said first portion of said driver-loose key being inserted into said hole from a radially outer side of said rim base, said second driver pocket being defined by a pair of members spaced from each other in said circumferential direction of said bead seat band and projecting in an axial direction of said bead seat band from an axially outer surface thereof, and a groove being defined between said pair of members so as to extend in a radial direction of said bead seat band and into which said second portion of said driver-loose key is inserted from an axially outer side of said bead seat band.

4. The mechanism of claim 1, wherein a surface of said first driver pocket and a surface of said second driver pocket in facing relation to each other extend in parallel with each other.

5. The mechanism of claim 1, wherein said first driver pocket and said second driver pocket are fixed on said rim base and said bead seat band, respectively, by welding.

6. The mechanism of claim 1, wherein a difference between a width of said third portion of said driver-loose key and a width of said groove and a difference between a width of said fourth portion of said driver-loose key and said width of said groove are less than or equal to 1.2 mm.

* * * * *